June 19, 1956     E. E. SIVACEK     2,750,873
TOASTER TIMER

Filed Oct. 28, 1952     5 Sheets-Sheet 1

INVENTOR.
Emil E. Sivacek.
BY
Harness, Dickey & Pierce
ATTORNEYS.

June 19, 1956  E. E. SIVACEK  2,750,873
TOASTER TIMER
Filed Oct. 28, 1952  5 Sheets-Sheet 2

INVENTOR.
Emil E. Sivacek.
BY
Harness, Dickey & Pierce
ATTORNEYS.

June 19, 1956     E. E. SIVACEK     2,750,873
TOASTER TIMER

Filed Oct. 28, 1952     5 Sheets-Sheet 3

INVENTOR.
Emil E. Sivacek.
BY
Harness, Dickey & Pierce
ATTORNEYS.

June 19, 1956   E. E. SIVACEK   2,750,873
TOASTER TIMER

Filed Oct. 28, 1952   5 Sheets-Sheet 4

INVENTOR.
Emil E. Sivacek.
BY
Harness, Dickey & Pierce
ATTORNEYS.

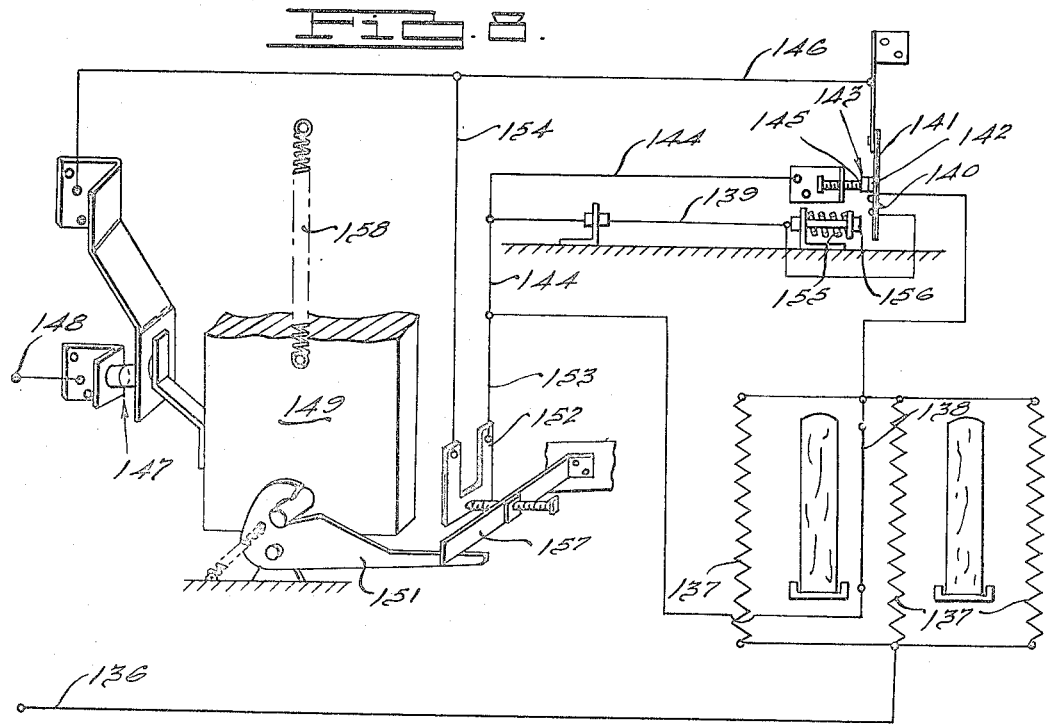
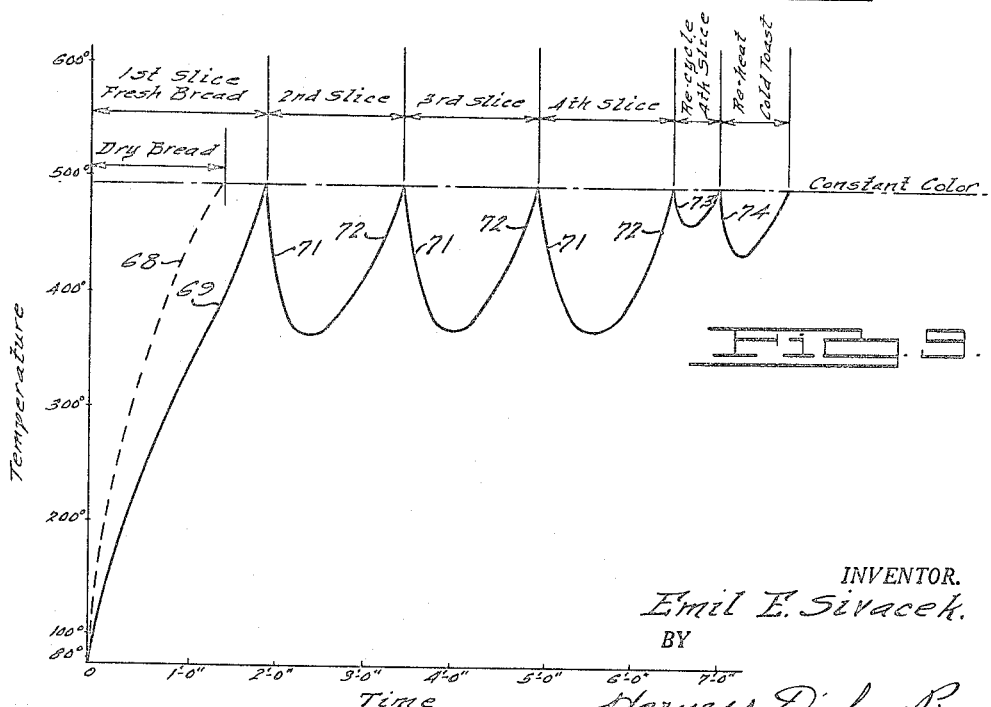

United States Patent Office 2,750,873
Patented June 19, 1956

2,750,873

TOASTER TIMER

Emil E. Sivacek, Ann Arbor, Mich., assignor to King-Seeley Corporation, Ann Arbor, Mich., a corporation of Michigan Application October 28, 1952, Serial No. 317,220

13 Claims. (Cl. 99—329)

This invention relates to cooking devices, and more particularly to timing mechanisms adapted to control the quality and color of toast in electric toasters.

In the past various bread toasters have been proposed in which the heaters are controlled by radiation-sensitive elements responsive to the surface temperature of the bread being toasted. An example of such a device is Hurxthal et al. No. 1,540,628 in which a wire element is located adjacent the bread slice, the heat absorbed by this wire during the toasting cycle causing it to elongate and eventually actuate tripping means to terminate the cycle. No current passes through the wire element in Hurxthal et al., the heat which causes the element to expand being received from the bread surface as well as the adjacent heating element.

Such a device has inherent disadvantages which make it impractical, these stemming at least partly from the fact that the wire, due to its arrangement in the mechanism, has a time lag in heating and cooling which destroys uniformity of operation during repeated toasting cycles. Various means have been proposed in an attempt to overcome the disadvantages of the Hurxthal arrangement while still utilizing the principle of an element responsive to bread surface radiation. Some of these proposals have taken the form of heat sinks which are intended to hasten cooling of the radiation-responsive element, or of shielding means for preventing radiation from the heating elements from affecting the control element of the toaster. An example of the latter type of construction is Koci No. 2,459,169 in which an elaborate arrangement is provided for limiting the response of a radiation-sensitive bimetal to the bread surface temperature. Another expedient which has been adopted in such systems to overcome the mass time lag is what is frequently called ambient temperature compensation. Koci provides such means in his toaster in addition to the shielding means, and other patentees such as Myers et al. No. 2,179,422 have utilized such an arrangement.

It is an object of the present invention to provide a surface temperature responsive toaster which overcomes the disadvantages of the earlier systems described above, which eliminates the need for ambient temperature compensation, heat sinks, shields or other means for insuring the uniformity of toast color, and in which the radiation-sensitive element has little mass time lag in heating or cooling.

It is another object to provide an improved toaster control mechanism of the above nature which will produce toast slices of uniform color regardless of the type of bread used, the time between cycles, and voltage variations of the power supply.

It is also an object to provide a toasting control mechanism having the above characteristics, in which the radiation-sensitive element is given greater cooling impetus when the toasting cycle is completed. In this connection, it is an object to provide a system in which the radiation-sensitive element receives heat energy not only from the bread surface and the heater elements, but also from current carried through the sensing element itself, so that the sensing element is cooled not only by the removal of the toast slice and the shutting off of heater current, but also by shutting off of the current which it carries.

It is another object to provide a toasting control mechanism of the above nature which utilizes the principle of current change caused by a sensing element having a substantial temperature coefficient of resistivity. In connection with this object, the invention contemplates the provision of means responsive to the change in resistivity of the sensing element which will terminate the toasting cycle when a predetermined sensing element temperature has been reached, this temperature reflecting the toast color at the terminating point.

It is a further object to provide a toasting control mechanism as above described, in which means are provided for compensating voltage variations in the power supply, so that the responding element will terminate the toasting cycle when the proper sensing element temperature is reached, despite variations in the power supply voltage.

It is a further object to provide a toasting control mechanism of the above nature which is relatively simple in construction and can be easily and economically fabricated.

Other objects, features, and advantages of the present invention will be come apparent from the subsequent description, taken in conjunction with the accompanying drawings.

In the drawings:

Figure 8 is a view similar to Figures 4 and 6 showing a third modification of the invention in which a bimetal voltage compensator is used; and Figure 9 is a graph showing the temperature of the sensing element at its tripping points during repeated toasting cycles.

Figure 1:
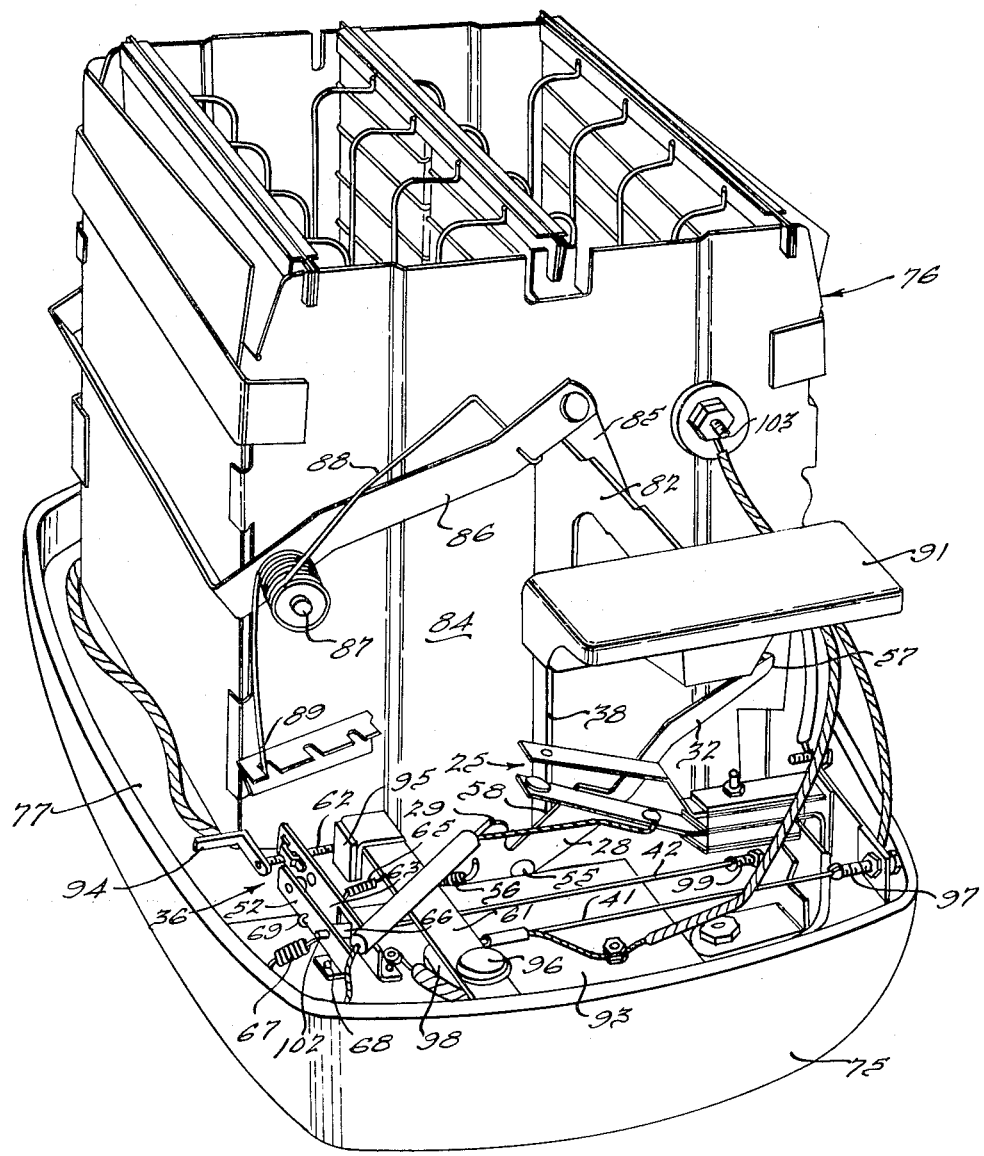
Figure 1 is a perspective view of a toaster having the toast control mechanism of this invention, the toaster housing being removed, showing the latch elements, timer switch, and time control elements.

The illustrated embodiment of the invention consists generally of a sensing element and a responding element which are placed in the toaster circuit to control the time of opening of the main heater switch, which is closed to energize the heating elements during the entire toasting operation. The sensing and responding elements are preferably in parallel with each other and in series with the heating element, and the sensing element consists of a ribbon or wire in the toasting chamber adjacent a bread slice surface and exposed to the heater elements, while the responding element is located anywhere outside the toasting compartment. The sensing element is fabricated of a material which has a high temperature coefficient of resistivity, for example nickel which has a positive coefficient, and the responding element is made of a material such as constantan having a very small temperature coefficient of resistivity and a relatively large temperature coefficient of linear expansion. Like the sensing element, the responding element is an elongated member of small mass in order to obtain rapid response and fast cooling.

At the start of a toasting cycle, the bread is placed in the toasting chamber and the carriage is depressed, thus closing the main contacts and latching the carriage in toasting position. As current flows through the heater elements it also flows through the sensing and responding elements. Since these two elements are in parallel, the proportions of current initially flowing through each will be dependent upon their relative cold resistances. As the bread begins to brown, the temperature of the sensing element begins to rise, and as is discussed in detail below, it has been found that, due to its sensitivity to radiation from the bread surface, the rise in temperature of the sensing element is in harmony with the surface temperature of the bread. As the sensing element temperature rises its resistance increases proportionately, and since the resistance of the responding element remains nearly constant, it will be subjected to a gradually increasing current flow. This in turn will cause a proportionate expansion of the responding element, for example under the influence of a spring. When the sensing element reaches a certain temperature, its corresponding resistance will cause an amount of current to flow through the responding element sufficient to cause it to trip the latch due to its linear expansion. The toasting cycle will therefore be terminated at a predetermined temperature of the sensing element.

The sensing element temperature is influenced by four main factors, the radiation from the heater elements, the radiation from the bread surface, ambient temperature changes in the toasting chamber, and the current carried by the sensing element itself. As is well known, the radiative properties of a surface are proportional to the fourth power of the absolute temperature, so that the radiant energy from the bread surface affecting the sensing element will be an indication of the surface temperature, which in turn always corresponds to a definite color on the bread surface. Because of the proximity of the sensing element to the bread surface, the bread surface temperature will be the primary factor controlling the sensing element temperature in the last part of the toasting operation.

When the heater elements are de-energized to end the cycle, the current flow through the sensing and responding elements will also be terminated, allowing these elements to rapidly cool because of their small mass and the cooling impetus imparted by current cutoff. No matter how many cycles are run, or what the condition of the bread is at the start of a cycle, the termination of a cycle occurs when the current through the responding element reaches the proper value, and this current always is controlled by the temperature of the sensing element. Thus bread slices of varying amounts of moisture may be toasted to the same color, and previously toasted bread may be reheated without changing its color. To compensate for current variations in the responding element caused by fluctuations in applied voltage, means are preferably provided for automatically changing the tripping point of the cycle so that the toast color will remain the same.

In order to understand the principles of operation of the invention, the toaster control mechanism will first be described with reference to the schematic arrangement of Figure 4, which shows the essential mechanical parts as well as the electrical circuit. The toaster comprises a group of heater elements 21 which are in parallel arrangement between and on either side of the slices 22 of bread to be toasted, the latter being carried by bread racks 23 secured to bread carriage 24. It will be understood that the principles of the invention are equally applicable to toasters having different slice capacities. The movement of the bread carriage is adapted to operate a main switch 25 in series with one side 26 of the power supply, the arrangement being such that movement of the bread carriage into toasting position will close main switch 25 as seen in Figure 4, whereas upon return of the bread carriage by means of spring 27, switch 25 will be opened.

Figure 4:
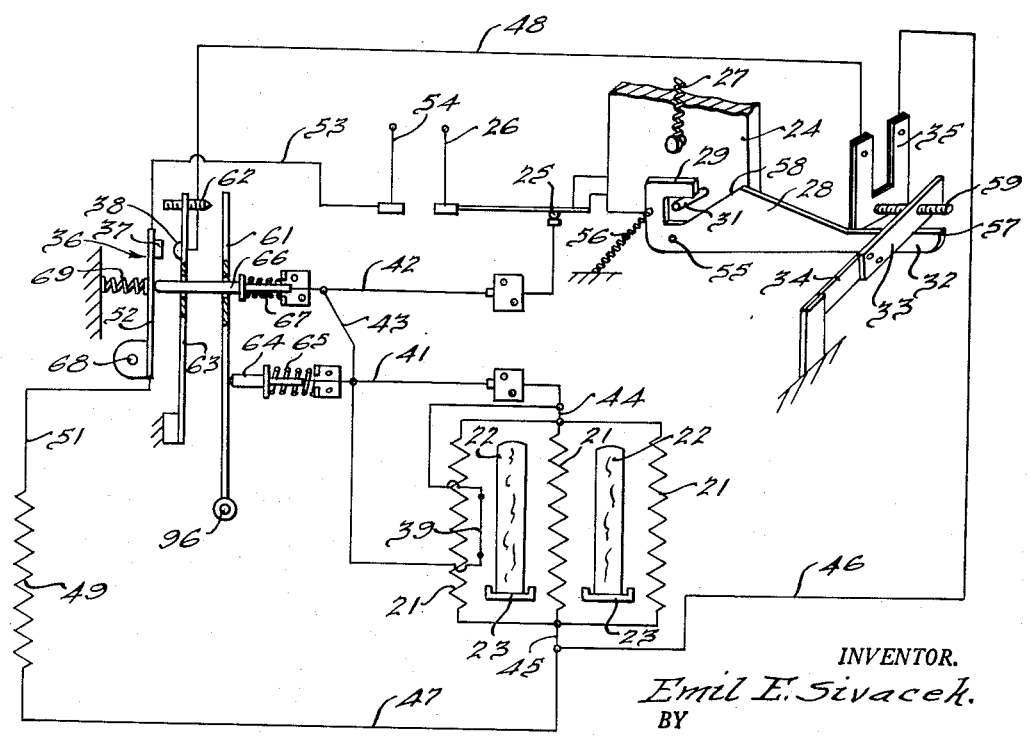
Figure 4 is a schematic showing of the elements of the toaster with their wiring connections.

Means are provided for latching the bread carriage 24 in its toasting position, and this means comprises a latching member 28 which is swingable into latching position as shown in Figure 4 by downward movement of the carriage, so that latching portion 29 of the latching member engages detent 31. Latching movement of the latching member carries the arm 32 thereof past timer detent arm 33 which is yieldably supported by leaf spring 34 so as to allow the arm 32 to be forced past the detent. The latching member 28 is thereafter prevented from swinging into unlatching position because of the engagement of arm 32 by detent 33.

After the toasting operation is completed, the detent 33 is moved out of its detaining position by means of a bimetal latch tripping motor 35, shown as being of U-shape in Figure 4. Operation of the bimetal motor 35 is controlled by the closing of a timer switch generally indicated at 36 which comprises a pair of contacts 37 and 38. In the embodiment shown in Figure 4, switch 36 is connected in series with the bimetal motor and in a manner to be described later, the closing of switch 36 causes the motor 35 to move detent 33, thus releasing latch member 28 and allowing spring 27 to lift carriage 24, ejecting the toast and opening main switch 25. It will be understood that other types of latch tripping means could be employed within the scope of the invention.

The circuit sensitive to bread surface radiation which controls the operation of switch 36 includes a sensing element 39 and a responding element 41 which are connected in parallel with each other but in series with the heater elements 21. The sensing element is located in the toasting chamber adjacent the bread surface and exposed to the heating elements, while the responding element is preferably located outside the toasting chamber. The circuit path leads from one side 26 of the power supply, through main switch 25, through a voltage compensator element 42, the function of which is described later, lead 43, sensing element 39 and responding element 41 in parallel, lead 44, heater elements 21 in parallel, and lead 45, to branches 46 and 47. Branch 46 is connected to one end of the U-shaped bimetal latch tripping motor 35, the other end of the motor being connected through lead 48 to switch contact 38 of switch 36. Branch 47 leads to one end of a current limiting resistor 49, the other end of which is connected by lead 51 to switch arm 52 carrying contact 37, this contact being in conducting relation with the switch arm. Switch arm 52 is in turn connected by lead 53 to the other end 54 of the power supply.

To further describe the mechanical elements of the toaster which are necessary to an understanding of the operation of the timing device, the latch member 28 is pivotally supported at 55 and is urged by a spring 56 in a counterclockwise or unlatching direction as seen in Figure 4. The detent 33 which is disposed in obstructing relation with arm 32 of the latching member is forced to the right by curved cam surface 57 at the end of the arm when carriage detent 31 strikes inclined cam surface 58 as it moves downwardly. An adjusting screw 59 is carried by detent 33 in opposed relation with U-shaped bimetal motor 35, so that the distance which the motor has to move before tripping the latch can be adjusted. Switch 36, which is normally open, is closed by the movement of a switch actuator 61, this member moving to the left in Figure 4 against an adjusting screw 62 mounted on switch arm 63 which carries contact 38. The position of the actuator is in turn controlled by a member 64 in engagement therewith, member 64 being urged against one side of the actuator by a spring 65. The responding element 41 is secured to member 64 and restrains this member against movement by spring 65, so that elongation of the responding element as it expands due to higher temperatures will cause switch 36 to close.

In operation, assuming the toaster is cold and the bread carriage 24 is in its raised or non-toasting position, one or more slices of bread are inserted in the toaster and the bread carriage 24 lowered, closing switch 25 and causing the latching member 28 to rotate clockwise in Figure 4 against spring 56. Arm 32 of the latching member will be forced past detent 33, the latter being swung momentarily to the right against the action of yieldable support 34. At this time bimetal motor 35 is cold and is therefore moved away from screw 59 which projects from detent 33. Current will flow from side 26 of the power supply through main switch 25 and voltage compensator 42, the action of which is described below. From the voltage compensator the current travels through lead 43 and thence into parallel paths through sensing element 39 and responding element 41. These parallel paths terminate at lead 44 from which the current flows through heater elements 21 in parallel. From the heating elements the current flows through lead 45 and thence through lead 47, resistor 49, lead 51, switch arm 52 and lead 53 to the other side 54 of the power supply. No current will at this time flow through lead 46, bimetal latch tripping motor 35 or lead 48, since the contacts 37 and 38 are separated.

The bread slices 22 will thus begin to toast, while the latch tripping motor 35 remains cold and the latch undisturbed. As described above, the sensing element 39 is located adjacent one of the bread slices in the toasting chamber, and will receive heat energy from the heating elements, the ambient toasting chamber temperature, and the current flowing through the sensing element itself. As the bread surface temperature begins to rise, the temperature of the sensing element will also be affected by the bread surface temperature, which eventually becomes the primary factor affecting the sensing element temperature. Since the responding element is in parallel with the sensing element, the proportion of current flowing through the responding element is dependent upon the instantaneous sensing element temperature. As the sensing element temperature increases, its resistance will likewise increase and the proportion of current flowing through the responding element 41 will increase. The spring 65 continually urges the responding element to elongate, and its increasing current and subsequent increasing temperature will cause its linear expansion. Member 64, the movement of which is controlled by the expanding responding element, urges the actuating element 61 toward the adjusting screw 62 supported by switch arm 63. The amount of extension of the responding element, and therefore the position of actuator 61, is dependent on the responding element current which in turn is dependent upon the sensing element current. Therefore, when the sensing element reaches a predetermined temperature the actuator 61 will reach a position such that switch contacts 37 and 38 are closed.

When this occurs the circuit through lead 46, bimetal motor 35, lead 48, contact 38, contact 37, lead 53 to side 54 of the power supply will be closed. This will bypass current which has been flowing through resistor 49, and will rapidly heat up bimetal motor 35, the value of resistor 49 being so chosen that it will take only a small proportion of the current after switch 36 is closed. When the bimetal motor is heated it will cause the detent 33 to move to the right, thus releasing arm 32 of latch member 28 which will be swung counterclockwise around pivot 55. Hook 29 of the latch member will release detent 31 on the bread carriage, and the latter will be pulled upward out of toasting position by spring 27. This will open main switch 25, de-energizing the heater elements as well as the other parts of the circuit. Sensing element 39 and responding element 41 will quickly cool, the contraction of the responding element causing actuator 61 to move away from switch 36. The latter will therefore be immediately opened and ready for the beginning of a new cycle. Bimetal 35 will also begin to cool when switch 25 is opened and will remain de-energized until timer switch 36 is again closed at the end of the next cycle.

Several facts regarding the operation of the control system should be kept in mind to properly appreciate the uniformity of its operation. The sensing element is so constructed that when it is at any given temperature it will have a corresponding resistance, and therefore at any given supply voltage the toasting cycle will always terminate at the same sensing element temperature. As stated previously, the sensing element, although affected by various sources of heat energy, is primarily controlled toward the end of the toasting cycle by the bread surface temperature. It should be clearly understood that for purposes of the invention it is not necessary that the bread surface temperature be higher than the temperature of the sensing element or that there be a resultant heat flow from the bread surface to the sensing element. In other words, the invention is completely operative under conditions in which the sensing element actually has a higher temperature than the bread surface throughout the cycle. The main requirement is that the bread surface temperature is the primary factor in controlling the resultant sensing element temperature.

For example, assuming that the sensing element, because of its reception of heat energy from the heaters, the ambient temperature and the current which it carries, has a higher temperature than the cold bread surface, there will be an initially high rate of heat flow from the sensing element to the bread surface. As the latter heats up, the temperature differential between the sensing element and the bread surface will decrease, so that the heat flow from the sensing element to the bread surface will decrease while its absorption of heat from the other three sources will continue undiminished. This action will obviously carry the sensing element toward its terminating temperature, and as it approaches this point the bread surface temperature will become the primary factor influencing sensing element temperature. In another example, if the bread surface temperature increases so rapidly with respect to the sensing element temperature that the latter receives heat energy from the bread surface, this heat energy will become the primary factor affecting the sensing element temperature as the bread surface grows hotter. In either case therefore it is seen that the sensing element temperature toward the end of the toasting cycle is an accurate measure of the bread surface temperature and that uniform color will therefore be obtained.

Another important factor which causes the radiation from the bread surface to be the primary factor in terminating the cycle is the fact that the radiation from the heating elements, the ambient temperature in the toaster chamber and the heat from the current flowing through the sensing element quickly reach a stationary constant value, so that the only heat source affecting the sensing element which varies widely in each cycle is the radiation from the bread surface. This emphasizes the fact that the timer works not because the toast surface is the primary source of heat for the sensing element but because the other sources of heat are relatively constant.

Another advantage which becomes apparent from the above description of operation is the fact that the sensing and responding elements are quickly cooled after the toast is removed. This is partly due to the small mass of the sensing and responding elements which allow them to lose their heat quickly. Another reason why the timer elements have little thermal lag is because part of their heating is caused by current carried by the elements themselves. The shutting off of this current at the end of the cycle causes a much greater cooling impetus than would be the case if the timer elements received heat only from outside sources.

Figure 5:
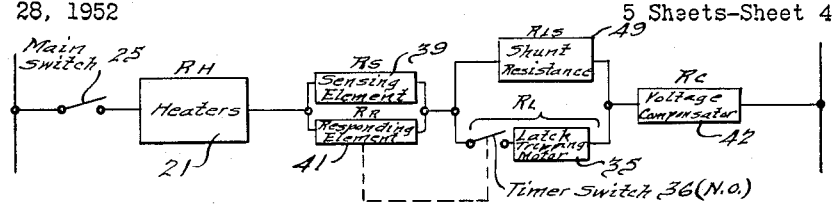
Figure 5 is an equivalent electrical diagram in simplified form.

In order to understand the electric characteristics of the circuit, a sample calculation using illustrative values of resistance and voltages is given. Referring to Figure 5, the following values may be assumed for purposes of the sample calculation:

The heating elements have a combined resistance when cold of $R_{HC}=11.76$ ohms and a resistance when hot of $R_{HH}=12$ ohms.

The sensing element portion of the timer has a resistance when cold of $R_{SC}=0.20$ ohm, and when its temperature is increased to 500° F. it undergoes a 125% increase in resistance arriving at a resistance when hot of $R_{SH}=0.45$ ohm.

The responding element of the timer is assumed to have a constant resistance $R_R=0.30$ ohm.

The combined resistance of the latch tripping motor and its controlling contacts is $R_L=0.12$ ohm.

The shunt resistance placed in parallel with the latch tripping motor should be high enough to insure actuation of the motor, but is also preferably as low as possible to reduce wattage losses, and may be chosen as approximately three times the resistance of the motor, or $R_{LS}=0.36$ ohm.

The voltage compensator, the purpose of which is described below, may have a resistance $R_C=0.05$ ohm.

With these illustrative resistance values and a line voltage E of 115 volts, the total current at the start of the cycle is $$I_T = \frac{E}{R_{HC} + \frac{R_{SC} \times R_R}{R_{SC}+R_R} + R_{LS} + R_C} = 9.36 \text{ amps.}$$

The total current at the termination of the cycle with the timer switch closed is $$I_{T'} = \frac{E}{R_{HH} + \frac{R_{SH} \times R_R}{R_{SH}+R_R} + \frac{R_{LS} \times R_L}{R_{LS}+R_L} + R_C} = 9.34 \text{ amps.}$$

The voltage drop across the time at the start of the cycle is $$E_T = I_T \times \frac{R_{SC} \times R_R}{R_{SC}+R_R} = 1.125 \text{ volts}$$

The voltage drop across the timer at the termination of the cycle would be $$E_{T'} = I_{T'} \times \frac{R_{SH} \times R_R}{R_{SH}+R_R} = 1.68 \text{ volts}$$

The current through the responding element at the start of operation would be $$I_R = \frac{E_T}{R_R} = 3.75 \text{ amps.}$$

The current through the responding element at the termination of the cycle would be $$I_{R'} = \frac{E_{T'}}{R_R} = 5.6 \text{ amps.}$$

The current through the sensing element at the start of the cycle is $$I_S = \frac{E_T}{R_{SC}} = 5.62 \text{ amps.}$$

The current through the sensing element at the termination of the cycle is $$\frac{E_{T'}}{R_{SH}} = 3.75 \text{ amps.}$$

It will be appreciated from the above sample calculation that as long as the line voltage remains constant, the responding element will always have a predetermined current when the sensing element reaches a predetermined temperature. However, if the line voltage is raised for example, the current through the responding element might reach this predetermined value before the sensing element reaches its predetermined temperature, so that the cycle would be terminated prematurely. Conversely, with a lower line voltage the sensing element temperature would be higher than its predetermined value before the responding element current would reach its predetermined amount, thus allowing the toasting to continue past the desired point. To compensate for possible variations in line voltage, the timer is preferably provided with means for delaying termination of the cycle when the line voltage is raised and for shortening the cycle when the line voltage is lowered. In the embodiment shown in Figures 1–4, this means takes the form of voltage compensator 42 which comprises a wire having a predetermined thermal coefficient of linear expansion. This wire may be in the same general location as responding element 41. A pin 66 is secured to the free end of wire 42, the pin being urged by a spring 67 against switch arm 52 of switch 36. This switch arm is pivotally supported at 68, and a spring 69, weaker than spring 67, urges the switch arm in a direction against pin 66 and toward closure of contacts 37 and 38.

Voltage compensator 42 is in series with the main switch 25 and therefore carries the full load current. The amount of current passing through the voltage compensator will of course be proportional to the applied voltage across line terminals 26 and 54, so that the amount of linear expansion of this wire is dependent upon the voltage. Consequently, the spacing between contacts 37 and 38 will be increased upon an increase in line voltage; likewise, a decrease in line voltage will cause wire 42 to contract, permitting spring 69 to urge contact 37 closer to contact 38. It is therefore seen that the amount of travel necessary before actuator 61 closes switch contacts 37 and 38 increases with increasing applied voltage and decreases with decreasing voltage. Thus, with a high voltage the responding element 41 must attain a higher current than normal before the cycle is terminated. This in turn means that the sensing element temperature and therefore the toast color will be allowed to reach the desired degree before the cycle is terminated. If, on the other hand, the voltage should drop below normal, the contraction of voltage compensator 42 will permit the responding element 41 to close switch 36 before its normal current is reached, thus insuring that sensing element 39 does not go beyond its normal temperature.

It should be observed that the voltage compensator and its associated parts do not interfere in any way with the operation of the timer portion of the device. It should also be noted that both the responding element and the voltage compensator may be placed anywhere in the toaster, although they are preferably located in the same area. These elements need not for example be placed in the toasting chamber, since correction for the ambient temperature of the toasting chamber is not necessary for the efficient operation of the device.

Figure 9 illustrates a typical sequence of toaster operations using slices of toast in relatively rapid succession. In the graph, the abscissa represents passage of time while the ordinate shows temperature of the sensing element. In accordance with the previous discussion, it may be assumed that the sensing element temperature is representative of the bread color so that the determining temperature point of each cycle indicates the color of the toast at that point. It will be noted that although dry bread represented by line 68 toasts quicker than fresh bread represented by line 69, the cycle terminating points are both at 500° F., showing that the toast in both cases was of the same color. The curves showing the timing cycle for the second, third and fourth slices of bread indicate the fact that rapid cooling of the sensing element takes place, as shown by portions 71 of the curves, and that this cooling is about the same after each insertion. The rising portions 72 of each curve indicate an increasingly rapid heating of the sensing element as the bread surface becomes heated. In all cases the operation terminates at 500° F. sensing element temperature.

The curve 73 showing immediate reheating of the fourth slice of bread illustrates the uniform operation of the toaster control mechanism. Here, because the toast surface was already hot, there was little heat transfer from the sensing element to the bread. If a timer were being used of the type in which the sensing element carries no current of its own, there will be little if any drop in temperature of the sensing element especially since there would be no heat sink action by the bread. In this case, the momentary shutting off of current through the sensing element causes an immediate drop in its temperature, sufficient to produce a sharp upward curve when the current is reapplied. The sensing element therefore responds accurately to the attainment of the proper toast surface temperature, and the cycle terminates at the same point as the previous cycles.

Curve 74 showing the reheating of a cold slice of toast, indicates the fact that even in such cases there is no appreciable darkening of the bread beyond the color normally attained. In this case the sensing element does not cool off as much as with an untoasted slice because the darkened toast displays even at the beginning of the cycle substantial radiating power. As before however the momentary current shutoff in the sensing element is sufficient to cool it well below the terminating temperature of the previous cycle so that upon its reheating the temperature curve will be sharply inclined.

Figure 2:
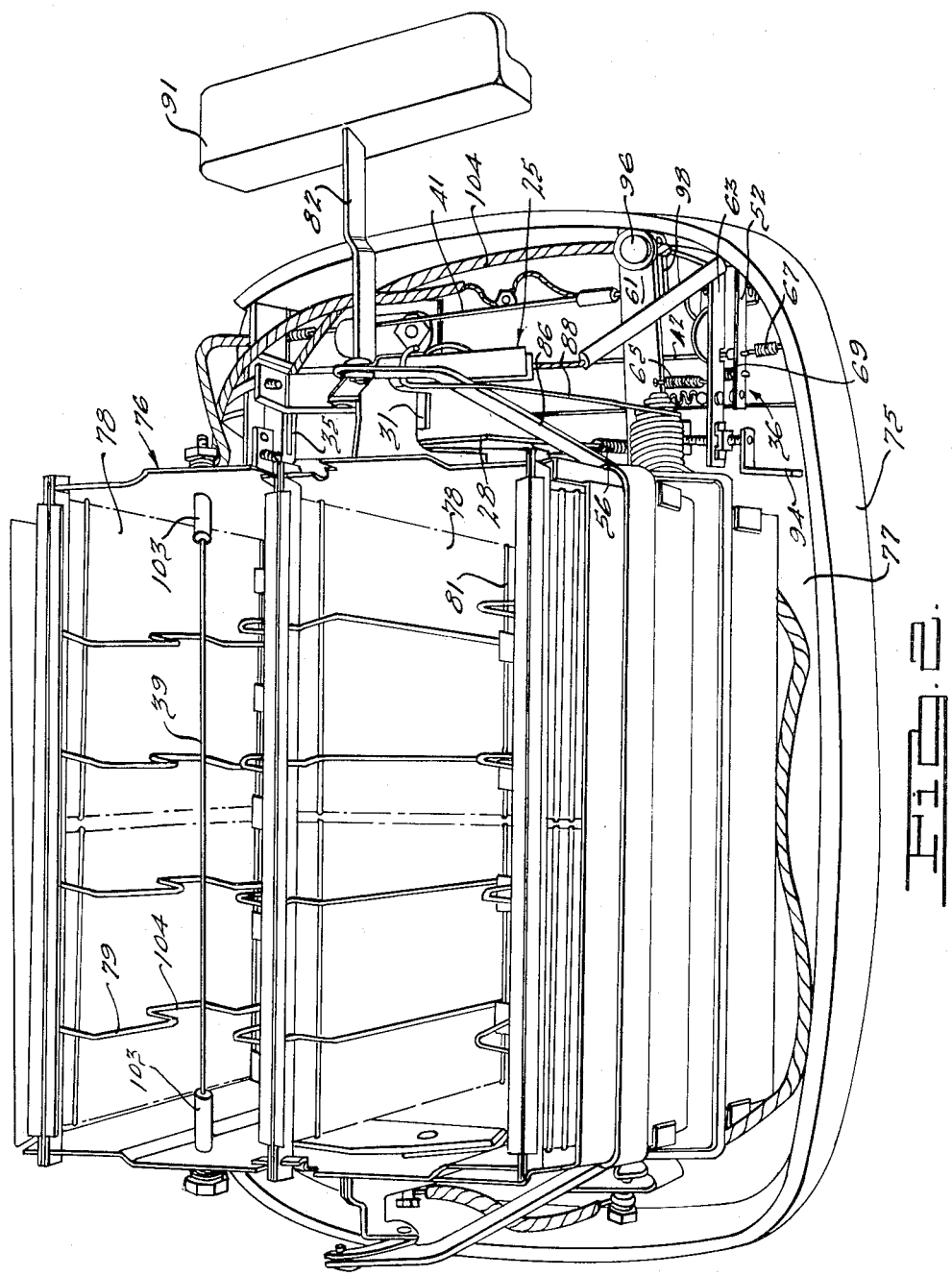
Figure 2 is a top perspective view with the housing removed, showing the location of the sensing element and heating means.
Figure 3:
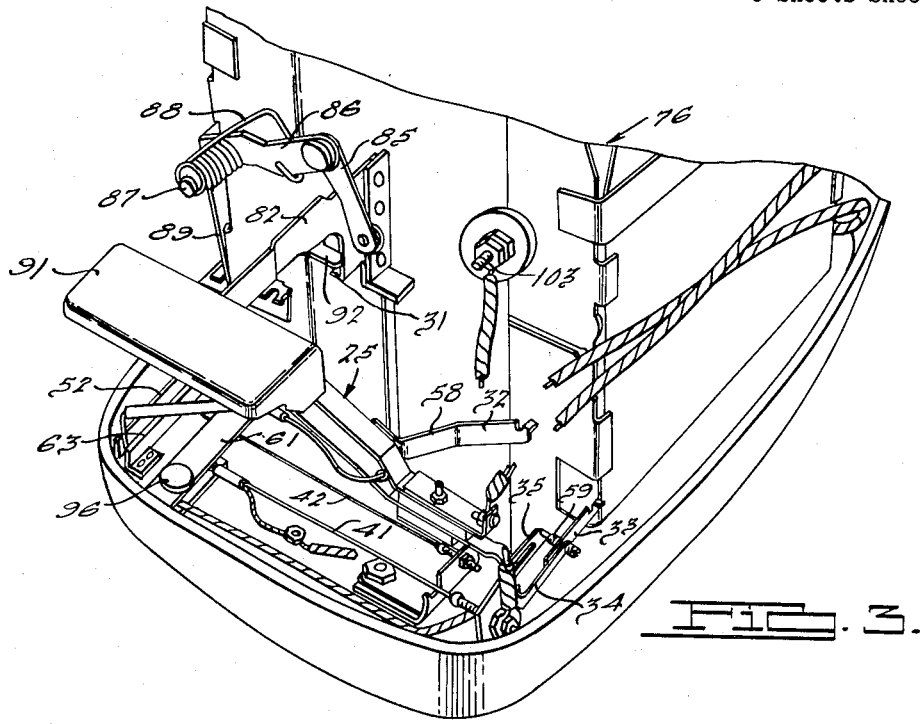
Figure 3 is a fragmentary perspective view from one side of the toaster showing the bimetal latch tripping means.

Figures 1–3 illustrate in a two-slice toaster a structural embodiment of the timer illustrated in Figure 4, and show the mechanical relationship of the parts, it being understood that the principles of the invention could as well be incorporated in other types of toaster constructions. As shown, the toaster comprises a base 75 upon which is supported the toasting chamber generally indicated at 76 by means of a base plate 77. The toasting chamber and bread carriage may be constructed along the lines of conventional toasters, such as that shown in Huck No. 2,570,453, including insulative supports 78 for heater wires 21, toast guide wires 79, and bread carriage 81. As shown, the toaster has two toasting chambers, and the handle extension 82 on bread carriage 81 is slidable in slot 83 in end wall 84 of the toasting chamber. A link 85 connects the carriage handle extension 82 with a U-shaped equalizing bar 86 which extends to the opposite side of the bread carriage. Bar 86 is pivoted to the toast chamber at both ends thereof, and the pivot 87 shown in Figure 1 supports a spring 88 held stationary at one end 89 and engaging bar 86 at its other end. This spring continually urges the bread carriage into its uppermost position, and the carriage can be moved downwardly by means of handle 91 against the action of spring 88, bar 86 equalizing the forces on both sides of the bread carriage.

Main switch 25 is supported beneath and in the path of a toe 92 carried by handle extension 82, visible in Figure 3, so that lowering of the handle will close the switch contacts. The latching member 28 is pivoted at 55 to the base plate and is continually urged in a counterclockwise direction as shown in Figure 1 by spring 56. Detent 31 carried by bread carriage extension 82 engageable with the cam surface 58 on latching member 28 to rotate the latching member clockwise, so that hook portion 29 thereof engages detent 31. Arm 32 of the latching member has cam surface 57 which is engageable with timer detent arm 33 to force the latter to the right as shown in Figure 3, spring support 34 of the arm then forcing it to the left into latching position over arm 32. U-shaped bimetal latch tripping motor 35 is mounted adjacent adjusting screw 59 on arm 33 and is adapted to swing to the right as shown in Figure 3 to release the latching member 28.

The timer switch 36 is supported on an insulating block 93 secured to the base plate and comprises switch arm 52 pivoted at 68 and switch arm 63 which is resiliently mounted. Arm 63 carries adjusting screw 62 which can be rotated to adjust the distance which actuator 61 must move before closing switch 36. In the structural embodiment, adjusting screw 62 may have attached thereto a handle 94 adapted to project from a portion of the casing (not shown) having markings thereon, so that the toast color may be readily chosen. Actutator 61 is provided with a tab 95 facing screw 62, and is pivoted at 96 to the insulating block. Spring 65 urges arm 61 in a counterclockwise direction as seen in Figure 1, pulling taut the responding element 41 which is fixed at one end 97 to the base plate and is secured at its other end to an extension 98 integral with actuator 61. Elongation of responding element 41 will therefore cause counterclockwise movement of actuator 61 to close switch 36.

The voltage compensator 42 is fixed at one end 99 to the base plate and extends past actuator 61 and through switch arm 63. The compensator carries member 66 engaging switch arm 52 and having an extension 102 engaged by tension spring 67 to urge switch arm 52 counterclockwise. Spring 69, which is weaker than spring 67, urges the switch arm 52 in a clockwise direction as seen in Figure 1, so that when the voltage compensator 42 contracts the space between switch contacts 37 and 38 will be reduced.

The sensing element 39 is visible in Figure 2 of the drawings, and in the present illustration only one sensing element is shown although it will be understood that the number and location of the sensing elements could be varied within the scope of the invention. As shown, the sensing element 39 is supported at both ends by extensions 103 at either end of the bread chamber, and the guide wires 79 are bent as shown at 104 to accommodate the sensing element. The sensing element is therefore out of the path of movement of the bread slices but in adjacent loose contact relation with the bread surface when the slice is in the toaster. Insulated electrical leads 104 connect the sensing and responding elements in their proper relationship as shown in Figure 4. It will be observed that since the sensing element is present in only one toasting chamber, this chamber will be used on occasions when a single slice of bread is being toasted. If a cycle is started with no bread in this chamber, the exposure of the sensing element to the heaters on both sides of the toasting chamber will cause it to quickly heat up and terminate the cycle, so that all likelihood of damage is prevented.

Figure 6:
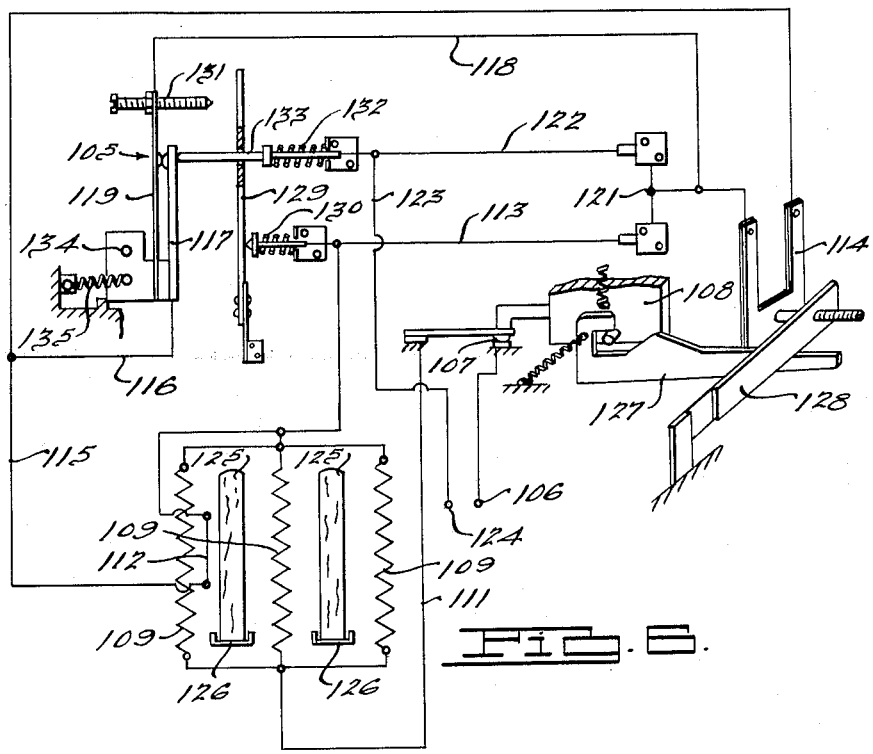
Figure 6 is a schematic showing similar to Figure 4 of a modified form of the invention in which the timer switch is normally closed.
Figure 7:
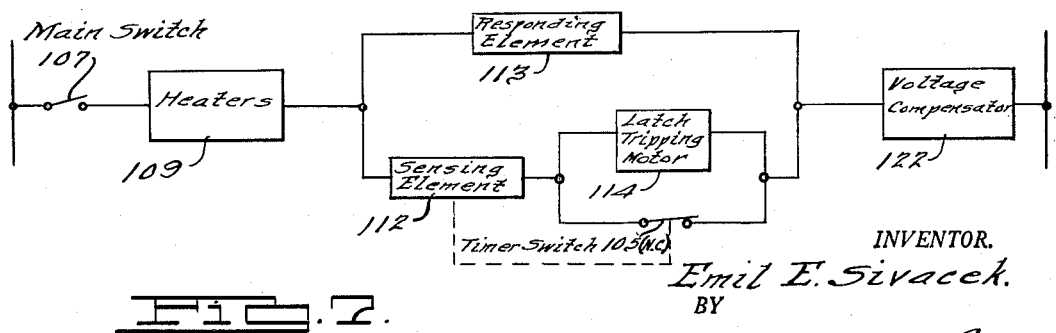
Figure 7 is a simplified equivalent circuit diagram of the form of the invention shown in Figure 6.

Figures 6 and 7 illustrate a second embodiment of the invention which is generally similar to the first embodiment but which utilizes a normally closed timing switch 105 instead of the normally open switch 36. As shown, one side 106 of the power supply is connected to main switch 107 which, as in the previous embodiment, is closed by the downward movement of bread carriage 108. The heater elements 109 are connected by lead 111 to the main switch, and the sensing element 112 and responding element 113 are connected in series with the heating elements and in parallel with each other. Timing switch 105 and bimetal latch tripping motor 114 are in series with the sensing element and in parallel with each other, switch 105 which is normally closed acting as a shunt switch to prevent current from passing through the latch tripping motor. In particular, leads 115 and 116 connect the sensing element to switch arm 117 of switch 105, and the closed switch contacts carry the current to lead 118 which is connected to switch arm 119. Point 121 forms a junction between the responding and sensing element branches of the circuit, from which the circuit leads through voltage compensator 122. From voltage compensator 122 the current flows through lead 123 to side 124 of the power supply. It will be noted by referring to the schematic equivalent of Figure 7 that the electrical arrangement is similar to that of Figure 5, except that the timer switch and latch tripping motor are in the sensing element circuit branch, and the shunt resistance for the latch tripping motor is eliminated. There is, of course, no need for this resistance since at the termination of the cycle the timing switch is open.

In the operation of the embodiment of Figures 6 and 7, the toast 125 will be inserted and the bread carriage 126 lowered, causing latch member 127 to latch the bread carriage in its lower position and be held by latch detent 128. At the beginning of the toasting process the current will pass through the heating elements, the sensing and responding elements, the timing switch 105 and lead 118 which shunts the latch tripping motor 114. When the sensing element attains the predetermined temperature, actuator 129 will be urged to the left by spring 130 enough to engage adjusting screw 131 carried by switch arm 119 and open switch 105. The shunt circuit being opened, current will flow through latch tripping motor 114, heating this bimetal and releasing latch member 127 from latch holding member 128. Should the voltage be varied, for example raised, voltage compensator 122 will be elongated due to the action of its spring 132, and movable extension 133 attached to the voltage compensator will engage switch arm 117. In this embodiment both switch arms are mounted for simultaneous pivotal movement around pivot 134, being urged by spring 135, which is weaker than spring 132, in a clockwise direction. Therefore, upon an increase in voltage and subsequent extension of voltage compensator 122, adjusting screw 131 carried by switch arm 119 will be moved further away from actuator 127, with results analogous to the action in the previous embodiment.

Figure 8 illustrates schematically a third embodiment of the invention which is generally similar to previous embodiments but which utilizes a bimetal type of voltage compensator in place of the wire type used previously. In this case side 136 of the power supply is connected to heating elements 137 and then through sensing element 138 which is in parallel with responding element 139. However, in series with the responding element is a small wattage heater 140 which is adjacent a bimetal 141 carrying one contact 142 of normally closed timing switch 143. The sensing and responding elements are connected to lead 144, which is in turn connected to adjustable contact 145 of the timing switch. Bimetal 141 is connected to lead 146 which is connected to main switch 147, the main switch in turn being connected to the other side 148 of the power supply.

In the operation of the embodiment of Figure 8, with the bread carriage 149 in its lower position and held by latch member 151, the main switch will be closed, and the current will be carried through the heating elements 137, sensing element 138 in parallel with small wattage heater 140 and responding element 139, lead 144, normally closed timing switch 143, bimetal 141, lead 146 and main switch 147 to line 148. It will be noted that the bimetal latch tripping motor 152 which is connected in parallel with the timing switch by means of leads 153 and 154, will be bypassed because the timing switch is closed. As the toasting progresses, responding element 139 will elongate under the influence of spring 153, and the actuator 156 will eventually engage bimetal 141, opening switch 143. The current will then pass through lead 153, latch tripping motor 152 and lead 154, thus moving latch detent 157 and allowing the bread carriage to be raised by spring 158. If the voltage should be varied, for example raised, the increased heat in heater 140 will cause end of bimetal 141 to be curved away from actuator 156, so that the responding element 139 must expand a greater amount before switch 143 is opened.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a bread toaster or the like, heating means, means for energizing said heating means to initiate a toasting interval, control means for causing said heating means to be deenergized to end said toasting interval, said control means including a wire element having a substantial positive temperature coefficient of resistivity and sensitive to heat on the bread surface being toasted, said wire being so disposed relative to said surface as to permit substantially all of the surface to be directly heated by said heating means, a responding element having a substantial temperature coefficient of expansion, means for connecting said two elements in parallel and applying a voltage thereto, the voltage being sufficient to increase the wire temperature substantially above that which would be caused solely by its sensitivity to the surface heat on said bread slice, the head on said bread surface during the toasting interval causing said wire to change its resistance value with a corresponding change in the relative values of currents in said two elements, and means responsive to a predetermined change in length of said responding element for terminating said toasting interval and removing said voltage.

2. In a bread toaster or the like, heating means, means for moving a bread slice into toasting relation with respect to said heating means and energizing said heating means to initiate a toasting interval, control means for de-energizing said heating means and causing said bread slice to be moved into non-toasting relation with respect to said heating means, said control means including an element having a substantial temperature coefficient of resistivity and sensitive to heat produced by said heating means, a responding element having a substantial temperature coefficient of expansion, means for connecting said two elements in a common circuit and applying a voltage thereto simultaneously with the initiation of said toasting interval, the heat produced by said heating means and the current in said first-named element causing said first-named element to change its resistance value with a corresponding change in the value of current in said responding element, and means responsive to the subsequent change in length of said responding element for releasing said holding means, de-energizing said heating means and removing said voltage.

3. In a bread toaster or the like, heating means, means for holding a bread slice in toasting relation with said heating means, a main switch controlling energization of said heating means, means for closing said main switch to initiate a toasting interval, control means for opening said main switch to end said toasting interval, said control means including a wire element in series with said heating means and sensitive to heat on said bread surface, said wire being so disposed relative to said surface as to permit substantially all of the surface to be directly heated by said heating means, the voltage applied to said wire being sufficient to increase its temperature substantially above that which would be caused solely by its sensitivity to the surface heat on said bread slice, said wire having a substantial positive temperature coefficient of resistivity, a responding element electrically connected to said wire and having a substantial temperature coefficient of expansion, heat on said bread surface during the toasting interval causing said wire to change its resistance value with a corresponding change in the relative values of currents in said two elements, a timing switch actuatable by the subsequent change in length of said responding element, and means responsive to the actuation of said timing switch for opening said main switch.

4. In a bread toaster or the like, heating means, means for causing said heating means to be energized for a toasting interval, a wire element having a substantial positive temperature coefficient of resistivity and sensitive to heat on a bread slice being toasted, said wire being so disposed relative to said surface as to permit substantially all of the surface to be directly heated by said heating means, a responding element having a substantial temperature coefficient of expansion, means for connecting said two elements in a common circuit, the voltage applied to said wire being sufficient to increase its temperature substantially above that which would be caused solely by its sensitivity to the surface heat on said bread slice, the heat on said bread slice during the toasting interval causing said wire to change its resistance value with a corresponding change in the relative values of currents in said two elements, means responsive to a predetermined change in length of said responding element for terminating said toasting interval, and compensating means responsive to changes in the voltage applied to said heating means for adjusting the amount of said predetermined change in length.

5. In a bread toaster or the like, heating means, means for causing said heating means to be energized for a toasting interval, an element having a substantial temperature coefficient of resistivity and sensitive to radiation from a bread slice being toasted, an elongated responding element having a substantial temperature coefficient of linear expansion, means for connecting said two elements in a common circuit, the radiation from said bread slice during the toasting interval causing said radiation-sensitive element to change its resistance value with a corresponding change in the relative values of currents in said two elements, a switch actuatable by a predetermined change in length of said responding element, means responsive to actuation of said switch for terminating the toasting interval, compensating means including a wire element in circuit with said heating means and having a substantial temperature coefficient of linear expansion, said wire element being responsive to variations in the voltage applied to said heating means circuit, and means for moving said switch in accordance with the changes in dimension of said wire element, whereby said predetermined change in dimension of the responding element is adjusted.

6. In a bread toaster or the like, heating means, means for causing said heating means to be energized for a toasting interval, an element having a substantial temperature coefficient of resistivity and sensitive to radiation from a bread slice being toasted, a responding element having a substantial temperature coefficient of expansion, means for connecting said two elements in a common circuit, the radiation from said bread slice during the toasting interval causing said radiation-sensitive element to change its resistance value with a corresponding change in the relative values of currents in said two elements, a switch actuatable by a change in dimension of said responding element, a thermostatic member movable by said responding element to actuate said switch, and an auxiliary heater in the circuit of said heating means and responsive to a change in the voltage applied to said heating means, said auxiliary heater affecting said thermostatic member whereby the amount of change in dimension of said responding element necessary to actuate said switch is adjusted.

7. In a bread toaster or the like, heating means, latch means for holding a bread slice in toasting relation with said heating means, means for causing said heating means to be energized for a toasting interval, a wire element having a substantial positive temperature coefficient of resistivity and sensitive to heat on said bread surface, said wire being so disposed relative to said surface as to permit substantially all of the surface to be directly heated by said heating means, a responding element having a substantial temperature coefficient of expansion, means for connecting said two elements in a common circuit, the voltage applied to said wire being sufficient to increase its temperature substantially above that which would be caused solely by its sensitivity to the surface heat on said bread slice, the heat on said bread surface during the toasting interval causing said wire to change its resistance value with a corresponding change in the relative values of currents in said two elements, a normally open switch actuatable to closed position by the subsequent change in length of said responding element, and tripping means for said latch energizable when said switch is closed to terminate said toasting interval.

8. In a bread toaster or the like, heating means, means for holding a bread slice in toasting relation with said heating means, latch means for causing said heating means to be energized for a toasting interval, an element having a substantial temperature coefficient of resistivity and sensitive to radiation from said bread surface, a responding element having a substantial temperature coefficient of expansion, means for connecting said two elements in a common circuit, the radiation from said bread surface during the toasting interval causing said radiation-sensitive element to change its resistance value with a corresponding change in the relative values of currents in said two elements, a normally open switch actuatable to closed position by a change in dimension of said responding element, latch tripping means energizable when said switch is closed to terminate said toasting interval, means responsive to changes in the voltage applied to said heating means, and means connecting said voltage-responsive means to said switch for adjusting the change in dimension necessary for said responding element to actuate said switch.

9. In a bread toaster or the like, heating means, means for holding a bread slice in toasting relation with said heating means, latch means for causing said heating means to be energized for a toasting interval, an element having a substantial temperature coefficient of resistivity and sensitive to radiation from said bread surface, a responding element having a substantial temperature coefficient of expansion, means for connecting said two elements in a common circuit, the radiation from said bread surface during the toasting interval causing said radiation-sensitive element to change its resistance value with a corresponding change in the relative values of currents in said two elements, latch tripping motor means operable when energized to terminate said toasting interval, a shunt circuit bypassing said motor means, a normally closed switch in said shunt circuit, said switch being actuatable to open position by a change in dimension of said responding element, means responsive to changes in the voltage applied to said heating means, and means connecting said voltage-responsive means to said switch for adjusting the change in dimension necessary for said responding element to actuate said switch.

10. In a bread toaster or the like, heating means, means for causing said heating means to be energized for a toasting interval, an element having a substantial positive temperature coefficient of resistivity and sensitive to radiation from said bread surface, an elongated responding element having a substantial temperature coefficient of linear expansion, means for connecting said two elements in parallel across an applied voltage, the radiation from said bread surface during the toasting interval causing said radiation sensitive element to change its resistance value with a corresponding change in the relative values of currents in said two elements, a switch actuatable by the subsequent change in length of said responding element, means responsive to the actuation of said switch for terminating said toasting interval, and means for manually adjusting the distance of travel of said responding means before said switch is engaged.

11. In a bread toaster or the like, heating means, means for holding a bread slice in toasting relation with said heating means, control means for causing said heating means to be energized for a toasting interval, said control means including a radiation-sensitive element having a substantial temperature coefficient of resistivity located adjacent a surface of the bread slice and exposed to said heating means, a responding element remote from said radiation-sensitive element and having a substantial temperature coefficient of expansion, means for connecting said two elements in a common circuit, the radiation from said bread surface during the toasting interval causing said radiation-sensitive element to change its resistance value with a corresponding change in the relative values of currents in said two elements, means responsive to a predetermined change in dimension of said responding element for terminating said toasting interval, and compensating means remote from said radiation-sensitive element and responsive to changes in the voltage applied to said heating means, said compensating means being operatively connected to said terminating means for varying the amount of said predetermined change in dimension.

12. The combination according to claim 2, said two elements being in series with said heating means, and a main switch movable to closed position at the beginning of said toasting interval and to open position after termination of said toasting interval.

13. The combination according to claim 12, said two elements being in parallel with each other in said common circuit.

References Cited in the file of this patent
UNITED STATES PATENTS

| | | |
|---|---|---|
| 1,528,053 | Hands | Mar. 3, 1925 |
| 1,540,628 | Hurxthal et al. | June 2, 1925 |
| 2,221,863 | Crane | Nov. 19, 1940 |
| 2,269,178 | Breneman | Jan. 6, 1942 |
| 2,320,347 | Brosseau et al. | June 1, 1943 |
| 2,387,586 | Humphreys | Oct. 23, 1945 |
| 2,414,396 | Sardeson | Jan. 14, 1947 |
| 2,420,188 | Olving | May 6, 1947 |
| 2,451,508 | Olving | Oct. 19, 1948 |
| 2,459,170 | Koci | Jan. 18, 1949 |
| 2,463,318 | Schneider et al. | Mar. 1, 1949 |
| 2,549,095 | Huck | Apr. 17, 1951 |
| 2,552,480 | Dickey | May 8, 1951 |
| 2,615,386 | Palmer | Oct. 28, 1952 |
| 2,625,642 | Davis | Jan. 13, 1953 |
| 2,631,524 | Theisen | Mar. 17, 1953 |